US008894165B2

(12) United States Patent
Sabounjian

(10) Patent No.: US 8,894,165 B2
(45) Date of Patent: Nov. 25, 2014

(54) SLIDABLE MESH TRAY AND CONTAINER

(71) Applicant: Pro-Mart Industries, Inc., Irvine, CA (US)

(72) Inventor: Azad Sabounjian, Irvine, CA (US)

(73) Assignee: Pro-Mart Industries, Inc., Irvine, CA (US)

( * ) Notice: Subject to any disclaimer, the term of this patent is extended or adjusted under 35 U.S.C. 154(b) by 0 days.

(21) Appl. No.: 14/034,863

(22) Filed: Sep. 24, 2013

(65) Prior Publication Data

US 2014/0091695 A1 Apr. 3, 2014

Related U.S. Application Data

(60) Provisional application No. 61/707,734, filed on Sep. 28, 2012.

(51) Int. Cl.
*A47J 31/44* (2006.01)
*A47J 47/16* (2006.01)
*A47J 31/36* (2006.01)

(52) U.S. Cl.
CPC *A47J 31/44* (2013.01); *A47J 47/16* (2013.01); *A47J 31/3642* (2013.01)
USPC .......................... 312/348.3; 312/126; 220/486

(58) Field of Classification Search
USPC .............. 312/126, 117, 122, 139.2, 210, 211, 312/212, 304, 330.1, 350, 348.3; 220/485, 220/486, 491, 495
See application file for complete search history.

(56) References Cited

U.S. PATENT DOCUMENTS

| 3,282,460 | A | | 11/1966 | Boznango | |
|---|---|---|---|---|---|
| D452,433 | S | | 12/2001 | Lazaris | |
| D474,110 | S | | 5/2003 | Sweeny | |
| D502,362 | S | | 3/2005 | Lazaris et al. | |
| D628,444 | S | | 12/2010 | Snider | |
| D628,445 | S | * | 12/2010 | Snider | D7/600.1 |
| D637,484 | S | | 5/2011 | Winkler | |
| D644,491 | S | | 9/2011 | Snider | |
| D647,398 | S | | 10/2011 | Winkler | |
| D647,399 | S | | 10/2011 | Winkler | |
| D657,588 | S | * | 4/2012 | Snider | D6/462 |
| D660,652 | S | | 5/2012 | Tiemann | |
| 8,167,125 | B2 | | 5/2012 | Kim | |
| D665,230 | S | | 8/2012 | Snider | |
| D670,943 | S | * | 11/2012 | Hertaus | D6/510 |
| D676,715 | S | | 2/2013 | Tsai | |

(Continued)

OTHER PUBLICATIONS

U.S. Appl. No. 13/631,550, filed Sep. 28, 2012, for a Slidable Wire Tray & Container, First named inventor Azad Sabounjian, Assigned to Pro-Mart Industries, Inc.

(Continued)

*Primary Examiner* — Daniel Rohrhoff
(74) *Attorney, Agent, or Firm* — Stetina Brunda Garred & Brucker; Lowell Anderson

(57) ABSTRACT

A coffee pod tray is provided with a housing having a slide extending along opposing sides of the housing. A tray configured to hold a plurality of coffee pods has a side frame with an exterior side frame moving along the slide of the housing. The tray has a limit stop formed by a rivet in a top of the housing so the rivet hits the back of the tray to keep the tray from being removed from the housing.

10 Claims, 11 Drawing Sheets

(56) References Cited

U.S. PATENT DOCUMENTS

| | | | | |
|---|---|---|---|---|
| D679,954 S | * | 4/2013 | Snider | D7/600.1 |
| D680,380 S | | 4/2013 | Tiemann | |
| D681,398 S | | 5/2013 | Tsai | |
| D708,909 S | * | 7/2014 | Tiemann | D7/600.1 |
| 2007/0170076 A1 | * | 7/2007 | Saddler | 206/6.1 |
| 2014/0048538 A1 | * | 2/2014 | Sabounjian | 220/486 |

OTHER PUBLICATIONS

Design U.S. Appl. No. 29/431,043, filed Aug. 31, 2012, for a Slidable Wire Tray & Container, First named inventor Azad Sabounjian, Assigned to Pro-Mart Industries, Inc.

* cited by examiner

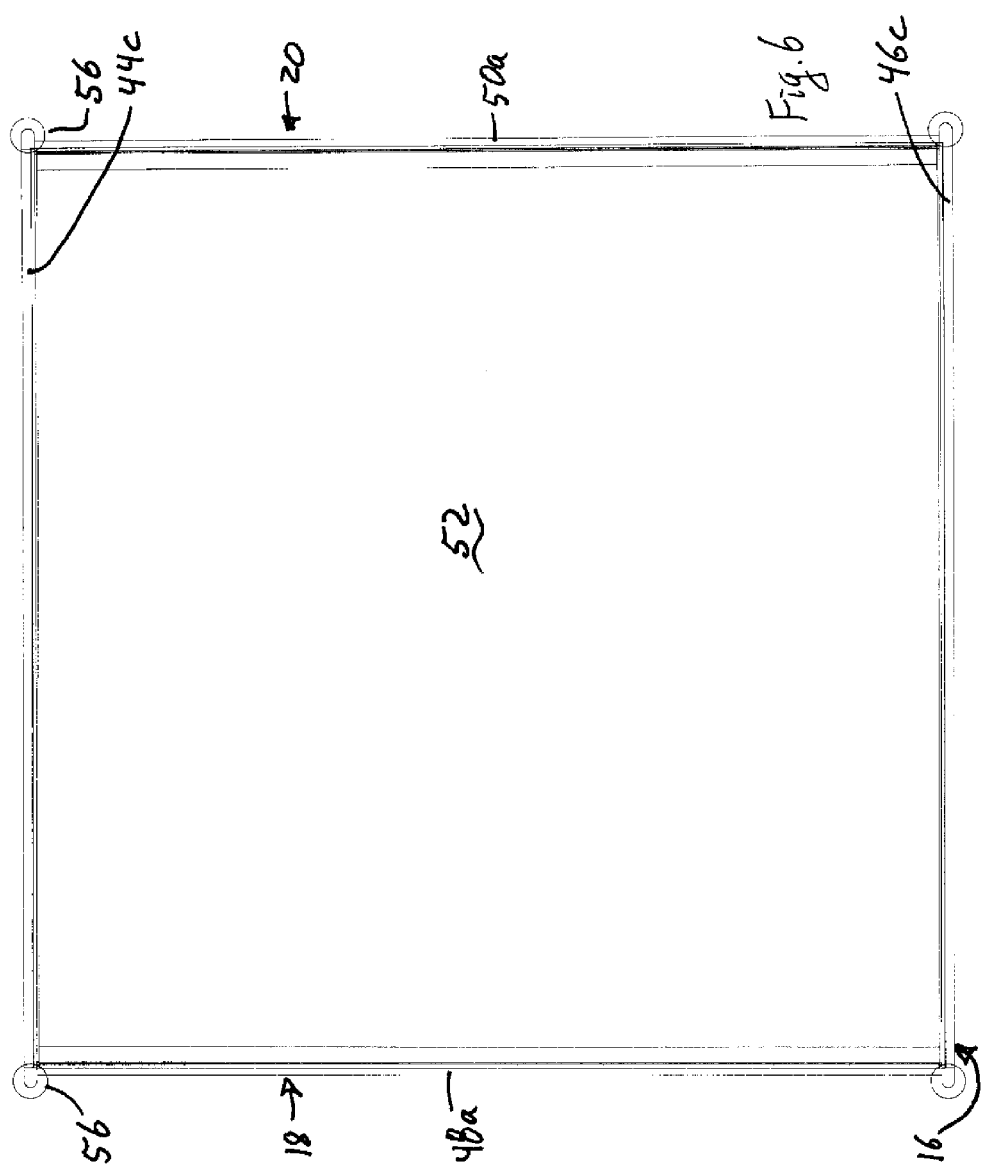

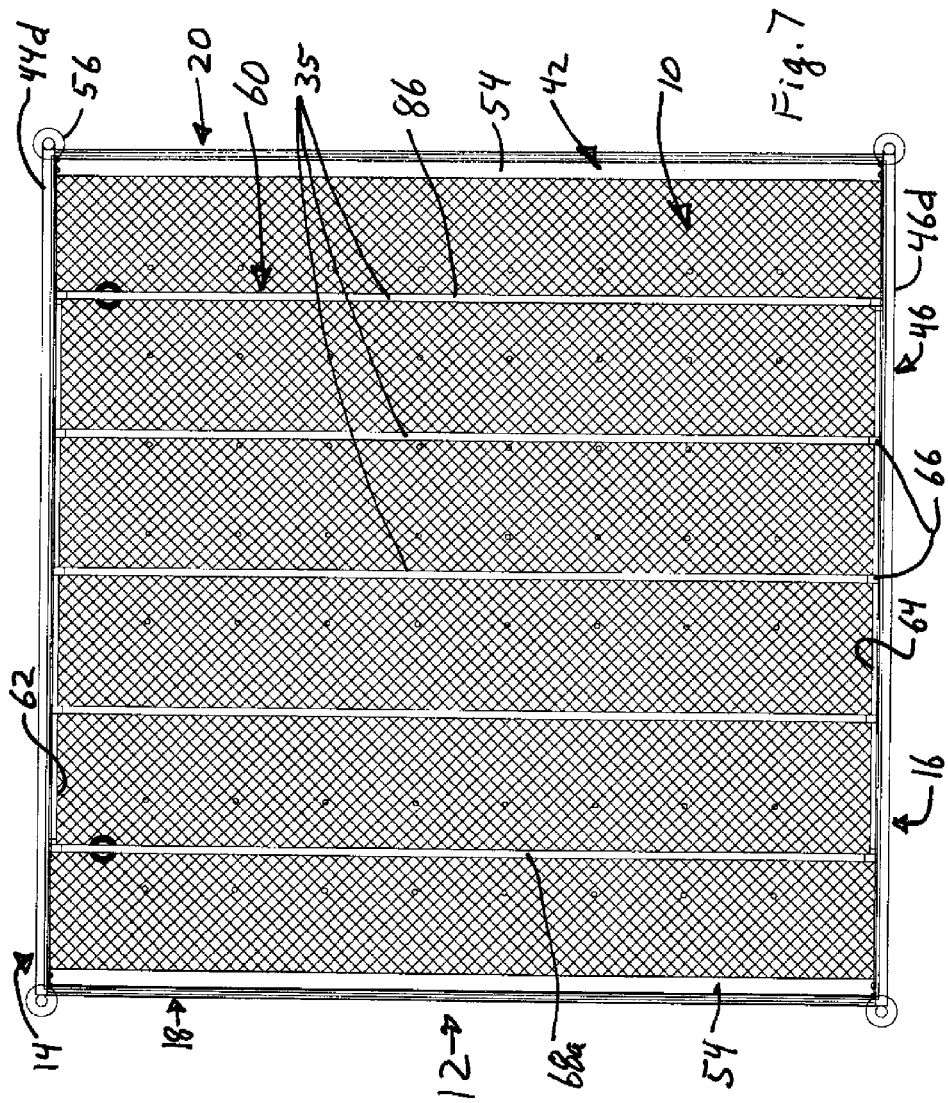

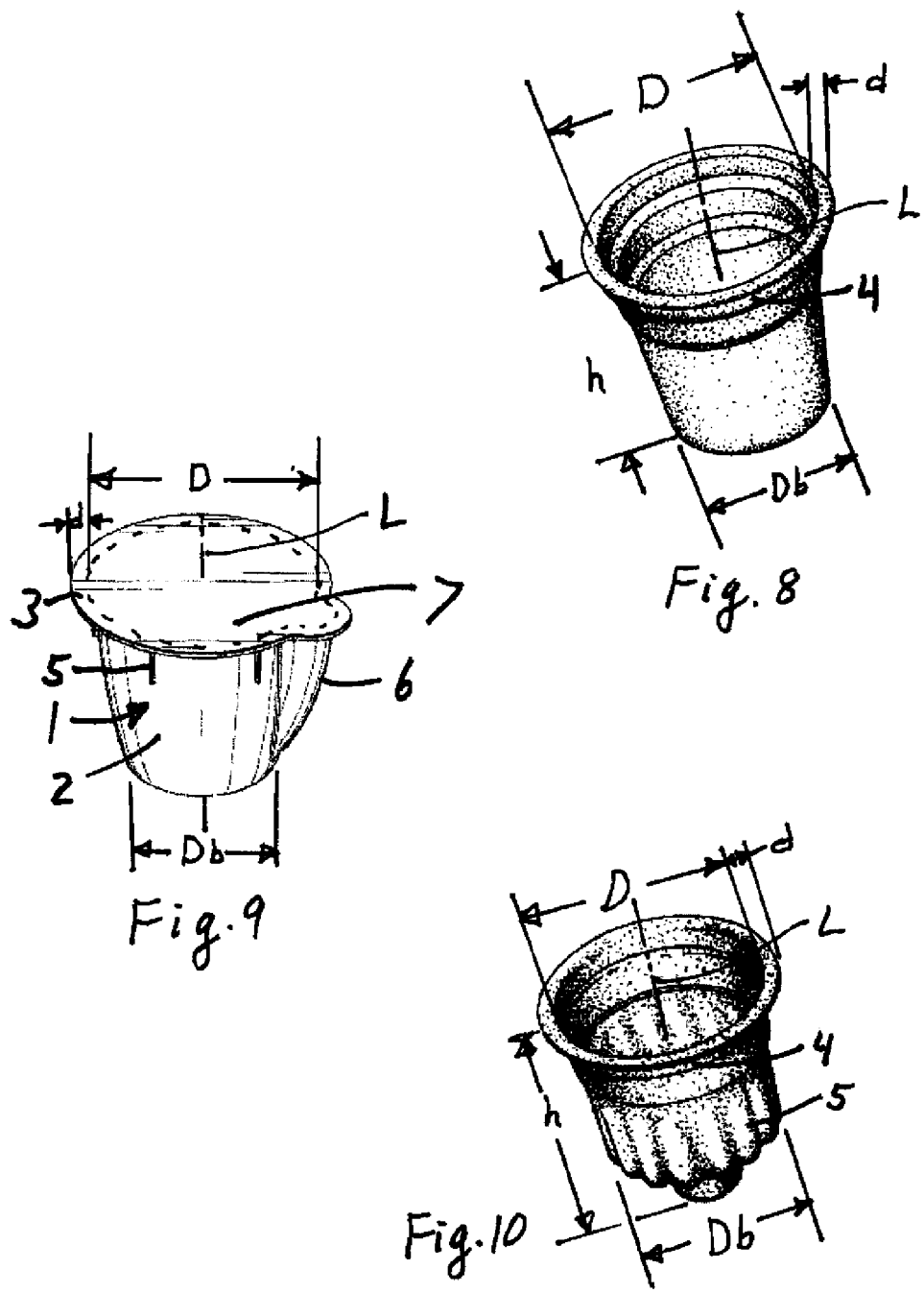

SLIDABLE MESH TRAY AND CONTAINER

CROSS-REFERENCE TO RELATED APPLICATIONS

The Application claims the benefit under 35 U.S.C. 119(e) to Provisional Patent Application No. 61/707,734 filed Sep. 28, 2012, the entire contents of which are incorporated herein by reference.

BACKGROUND

Rectangular trays with open tops are made to hold several rows of coffee pods. The trays may be slid in and out of a protective housing through an opening in the front of the housing into and out of which the tray is slid. The top of the housing is covered with a solid structure to support a coffee making machine in which the coffee pods are used. The trays have dividers which separate rows of coffee pods that sit on the bottom of the tray so the contents of the coffee pod are on the top, readily viewable by a user.

Coffee pods suitable for use in Keurig coffee making machines are currently of several general types as shown in FIGS. 8-10, with these and other pods shown in U.S. Pat. Nos. D452,433, D474,110, D502,362, D647,399, D647,398 and D637,484. The coffee pods comprise a thin plastic cup 1 having a continuous sidewall 2 and an outwardly extending flange 3 at the opening of the cup. The cup 1 can have various shapes but the shapes are typically tapered, being smaller at the bottom and larger at the top. Sometimes the walls of the cups 1 are stepped to form strengthening ribs 4 encircling the cup, especially near the flange 3. Sometimes longitudinal stiffening ribs 5 are used. Many coffee pods are symmetric about a longitudinal axis L. Some coffee pods have an outwardly extending projection 6 formed by the side of the container and shaped to form a pouring spout, with the flange 3 extending around the entire periphery of the top, including the spout. These coffee pots are symmetric about a plane through the middle of the spout and the longitudinal axis L. A foil sheet 7 is fastened to the flange 3, with a tab of foil or the foil itself usually extending outward from the flange a distance sufficient so that a user may grab the tab. In use, coffee is placed in the cups 1 and sealed by the foil to form a coffee pod. The contents are printed on the foil 7 covering the top of the cups 1. The pods are placed in holders having various shapes, including trays having rows separated by dividers, with the pods placed in the rows according to the printed indicia on the foil lids 7, which indicia usually identifies the type of coffee. A user selects a preferred type of coffee based on the printed indicia on the lid 7, removes the pod, pulls the tab to remove the foil and uses the coffee in the pod with a coffee brewing machine to make coffee.

As the coffee pods are removed for use the movement of the tray in and out of the housings sometimes causes the tray to be pulled out of the housing which can dump the coffee pods out of the tray. Sometimes, the tray does not smoothly slide out of the housing and that causes excess force or jiggling of the tray and housing to the frustration of users. Typical coffee pod trays have a larger height than needed, requiring housings that are higher than needed and openings that are larger than needed. There is thus a need for a lower, compact coffee pod tray and housing where the tray slides easily but resists being accidentally pulled entirely out of its housing.

BRIEF SUMMARY

A slidable, rectangular tray is provided having a side-frame on each side of the tray. Each side-frame is formed of a flat strip having a rectangular cross-section with a longer side of the rectangular cross-section on the bottom. The flat strip of material allows a lower profile than using rods with cylindrical cross sections as is typical in wire frame coffee pod housings and trays. The side-frames extend along the bottom of the tray and upward along the front and back of the tray at opposing sides of the tray. The side-frame is fastened to a sheet of mesh material that also extends along the bottom of the tray and is bent upward along the front and back of the tray and located on the inside of the side-frames. A top-frame extends around the rectangular periphery of the tray and fastens to the top of the side frames. The top frame has opposing sides that fasten to the ends of the side frames. The top frame preferably has a rectangular cross-section, with the narrower edge of the cross-section on the bottom and fastened to the ends of the side frames. The flat bottoms of the side fames form runners for the low profile tray. The housing has mating flat support surfaces extending from the front to the back of the housing so allow the runners to slide on the supports for easy insertion and removal while providing a lower profile opening in the housing to receive the tray. The distal ends of these support surfaces may have longitudinal indentations to locally stiffen the supports while allowing a low profile of the housing. A motion limit stop is formed in the top of the housing to keep the tray from accidentally being pulled out of the housing. The limit stop preferably comprises one or more rivets extending downward from a top surface of the housing and located to abut the back of the tray as it nears the front of the housing to limit relative motion of the tray and housing.

There is also provided a housing and tray assembly for holding coffee pods having a body with maximum body diameter D. The assembly includes a rectangular, wire frame housing wider than it is high and having two opposing sides, a top and bottom, a back and a front. A housing corner post is at each corner of the housing. The top may have a sheet of material covering it. The housing has an opening in the front with two slides each located at a different lower corner of the opening. The slides extend along opposing sides of the housing to a back of the housing to provide a generally flat surface extending the length of the housing. The housing has a rectangular, wire frame tray sized to fit into the opening in the front of the housing. The tray has an upper rectangular frame held in relative position by tray corner posts with two tray corner posts on each side having their bottoms connected by an exterior bottom frame member to form a rectangular side frame encircling each side. The tray posts and bottom frame member of each side frame formed of a strip of material having a rectangular cross section wider than it is thick and being located and orientated so the width of each side frame moves along a different one of the slides during use. The tray has an open tray top and an opposingly located tray bottom surface that is fastened to a top of each bottom frame member. The tray has a tray back and an opposing tray front each extending between different ones of the tray corner posts. A plurality of dividers are fastened to the front and back of the tray and spaced apart a distance of about D or slightly larger to define rows for receiving coffee pods during use.

In further variations, the housing and tray assembly has slides with a cross sectional shape having a horizontal and vertical leg each oriented at a right angle to each other. The horizontal leg may have at least one longitudinal indentation at the distal end of the runner at the front of the housing, and optionally also at the opposing distal end at the rear of the housing. The housing may have a motion limit stop extending downward toward the tray a distance sufficient to abut the back of the tray and limit relative movement of the tray and housing as the tray is pulled out of the opening n the housing. The motion limit stop may comprise a rivet fastened to the top surface of the housing. The tray bottom surface may be formed of a metal mesh material which is bent upward to form the front and back of the tray. Optionally, the tray bottom surface may be formed of a metal mesh material which is bent upward to form the front and back of the tray. The front of the tray may be framed by two front tray corner posts and a front support rail connected to the upper portions of the tray corner posts and without a rail member connecting the bottom of the front corner posts. Preferably, the front tray corner post has a rectangular cross section with a width larger than a thickness and oriented so that its thickness aligns with and fastens to the thickness of the corner posts.

BRIEF DESCRIPTION OF THE DRAWINGS

These and other features of the invention will be better understood by referring to the following description and drawings, in which like numbers refer to like parts throughout, and in which:

FIG. 6 is a top plan view of the coffee pod holder of FIG. 2;

FIG. 7 is a bottom plan view of the coffee pod holder of FIG. 2;

FIG. 8 is a perspective view of a K-cup coffee pod;

FIG. 9 is a perspective view of Vue® (a registered trademark of Kurig Corp.) cup coffee pod;

FIG. 10 is a perspective view of a further embodiment of a coffee pod;

DETAILED DESCRIPTION

Figure 1:
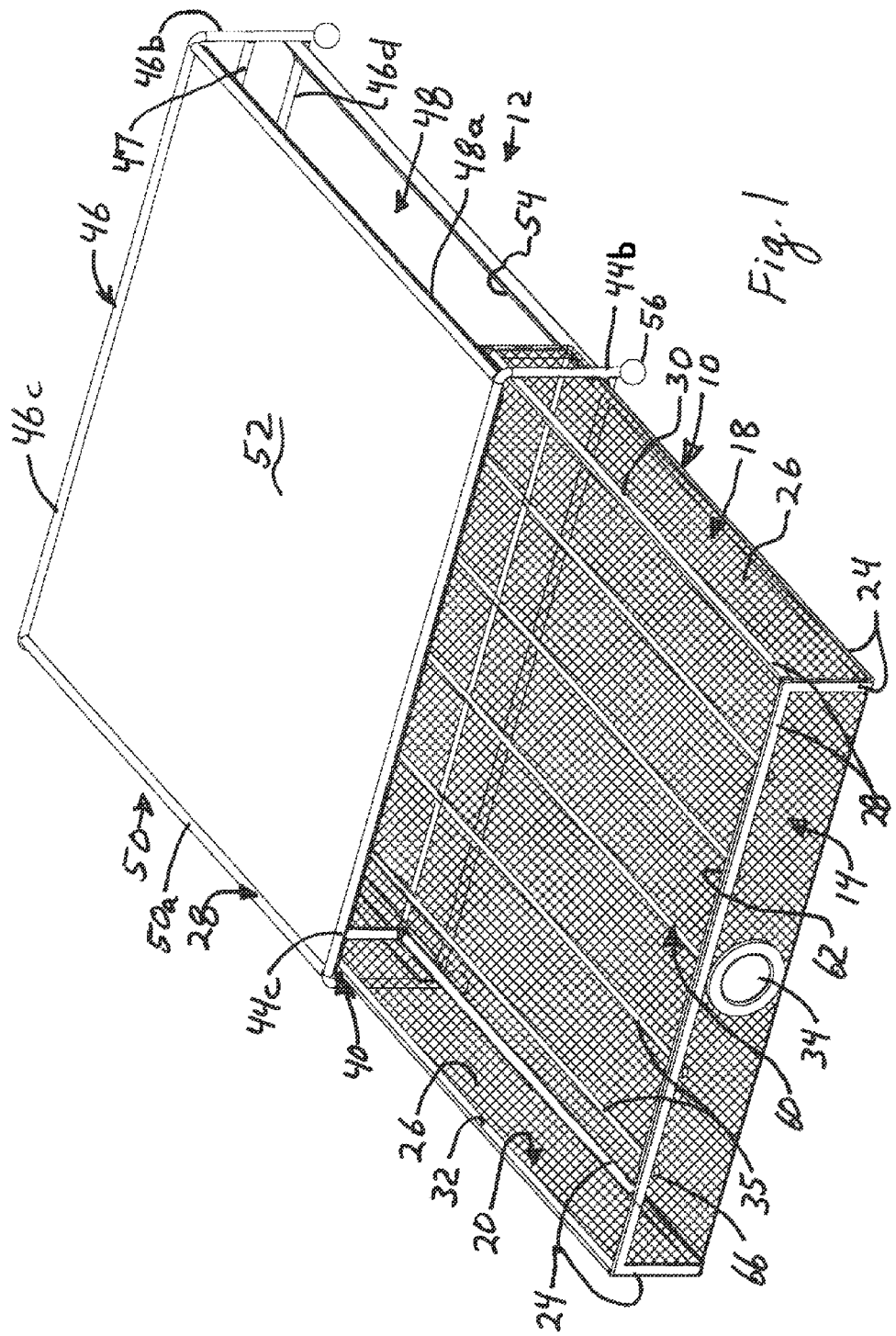
FIG. 1 is a front perspective view of the single tray, coffee pod holder of FIG. 1, with an empty tray extended and five dividers forming seven rows.

Referring to FIGS. 1-7, a tray 10 is slidably inserted into housing 12. The tray and housing are both preferably rectangular in shape with the width much larger than the height of the rectangle, but the proportions may vary. The tray 10 has a front 14 and back 16 joined by opposing sides 18, 20 and a bottom 22. The top of the tray 10 is preferably open but may be removably covered. Each side of the tray has a side frame 24 formed by a flat strip of material having a rectangular cross-section with a longer side of the rectangular cross-section on the bottom of the tray when in the orientation of FIG. 1. Each side frame 24 extends extend along the bottom 22 of the tray and upward along the front 14 and back 16 of the tray at opposing sides of the tray.

The side-frame 24 may be fastened to a sheet of mesh material 26 that also extends along the bottom 22 of the tray and is bent upward along the front to form front 14 and bent upwards along the back of the tray to form the back 16. The material 26 is located on the inside of the side-frames 24.

Figure 11:
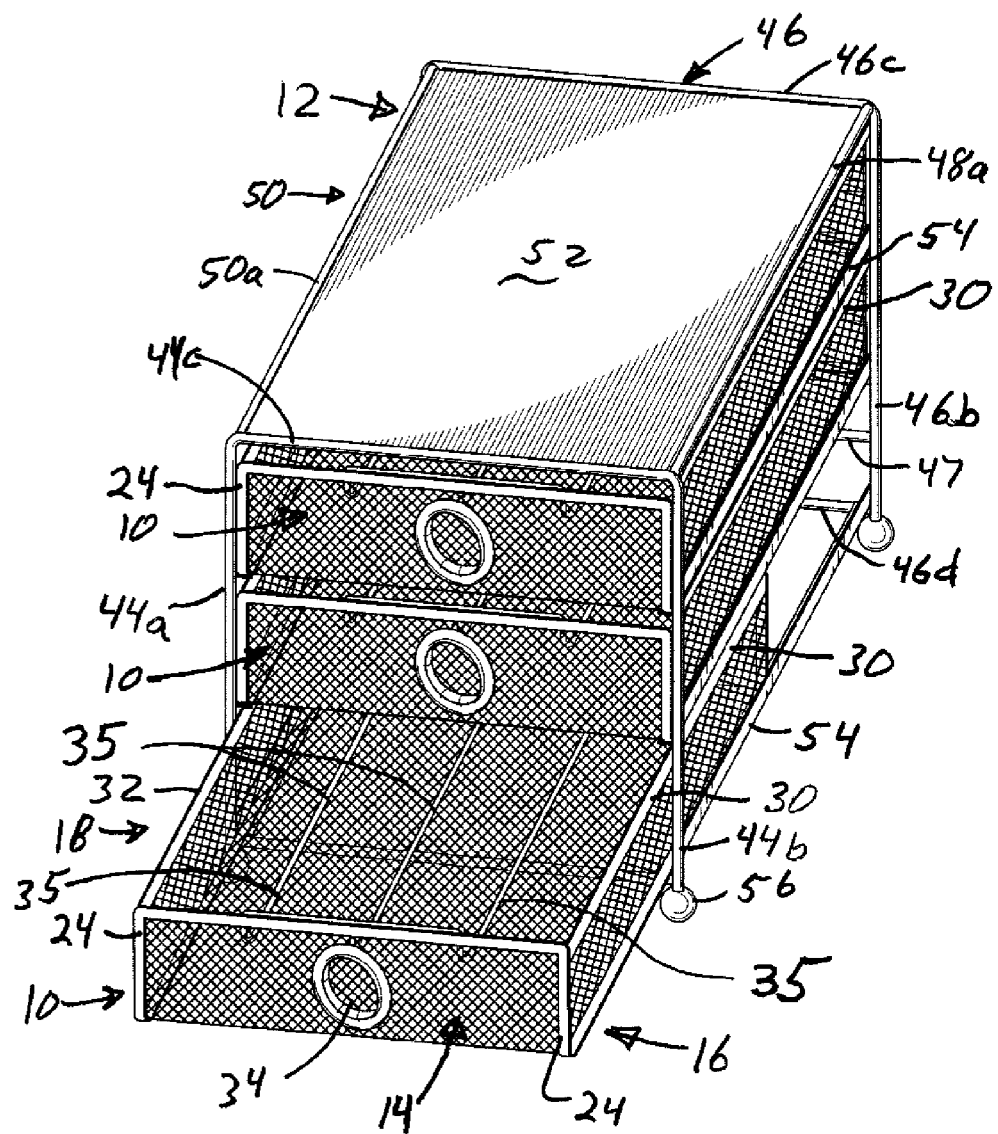
FIG. 11 is a perspective view of a coffee pod holder of FIG. 1 modified to have three trays as shown in FIG. 1 but in a housing adapted to hold those three trays, with three dividers instead of the five dividers of FIG. 1.
Figure 12:
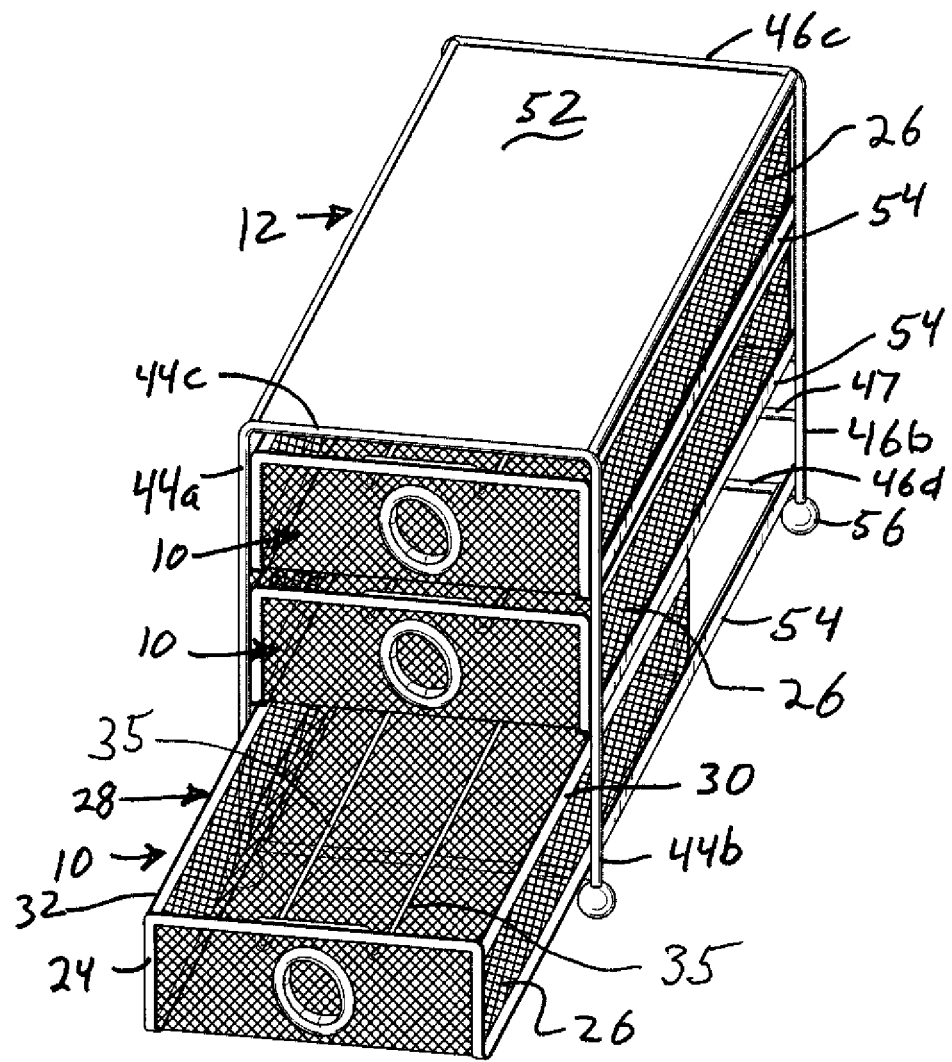
FIG. 12 is a perspective view of a coffee pod holder of FIG. 1 modified to have three trays as shown in FIG. 1 but in a housing adapted to hold those three trays, with two dividers instead of the five dividers of FIG. 1.

A top-frame 28 extends around the rectangular periphery of the tray and fastens to the top of the side frames. The top frame has opposing side members 30, 32 that fasten to the ends of the side frames 18, 20. The top frame 28 preferably has a rectangular cross-section, with the narrower edge of the cross-section on the bottom as shown in FIG. 1 and fastened to the ends of the sides 18, 20. Advantageously the side frames 24 and top frame 28 are of the same rectangular material so the longer edge of the side frames may abut the narrow edge of the top frame 28 and be fastened thereto so the juncture of the parts is in substantially the same plane The side frames 24 preferably curve or are inclined at the corners joining the bottom 22 to the front 14 and back 16 of the tray. The curvature or inclination makes it easier to insert the tray into the housing as discussed later. One or more dividers 35 may be placed inside the tray or a rack may be set in the tray to hold the dividers 35, with FIG. 1 showing five dividers, FIG. 11 showing three dividers, and FIG. 12 showing two dividers. Advantageously, the dividers 35 are fastened to the front 14 and back 16 of the tray 10. In the depicted embodiment, the dividers 35 are spot welded to the top frame 28 at the front and rear sides of that frame, with the dividers depending slightly below the top frame 28 so that when the top of the coffee pods are below the lips of the coffee pods when those pods rest on the bottom 22 of the tray 10. The dividers 35 may be formed from bent wire having a circular cross-sectional shape. The dividers 35 are preferably aligned to form rows along the length of the tray, with the rows spaced apart a distance sufficient to hold a coffee pod therebetween with the coffee pod resting on the bottom 22 of the tray.

The front 14 of the tray may have a handle to grab and manipulate the tray for opening and closing. Advantageously an opening 34 is provided in the front 14 to allow a user's finger to pull on the front 14 to open the tray 10, with the opening providing the handle.

The sides 14, 16 optionally have a covering. Advantageously, the same material 26 covering the bottom 22 covers the sides, with the material being fastened to the side frames 24 along the front, bottom and back, and fastened to the corresponding side members 30, 32 of the top frame 28 along the top. The material 26 is preferably, but optionally wire mesh with the parts being spot welded to the mesh. Thus, the material 28 is spot welded to the side frames 24 along the front, bottom and back of the tray with the edges of the material 28 at the front and back being spot welded to the abutting portions of the top frame 28. The top frame 28 is also spot welded to the ends of the side frames. Optionally, the wire mesh may extend in one piece across the bottom 22 and opposing sides 18, 20. Alternatively, the wire mesh may extend in one piece across the bottom 22 and opposing front and back 14, 16. Preferably, The housing 12 is rectangular in shape and preferably has a corresponding shape as the tray 10, but slightly larger than the tray. The housing has an opening 42 in the front 44 of the housing. The housing has back 46, sides 48, 50 corresponding to sides 18, 20 of tray 10, and a top wall 52 opposite bottom 42. The housing is preferably formed by an open, rectangular framework with a sheet of material on the top wall 52 of the frame. The housing framework is preferably formed of rods, with circular cross-sections preferred for the rods. Thus, there is a frame around the rectangular side 48, a frame around the rectangular side 40, a frame around the rectangular back 46, and a frame around the rectangular front 44. For ease of description the elongated members forming the side 48 are denoted 48a, 48b etc. depending on how many side members there are. Likewise, the elongated members forming side 50 are denoted 50a, 50b etc. depending on how many members form the open frame side. The front 44 forms an opening 42 into which the tray 10 is slidably inserted, with the sides 48, 50 being long enough to allow the tray 10 to be inserted into the housing, and the front and back 44, 46 being wide enough to accommodate the width of the tray 10. Preferably the housing 12 is only slightly larger than the tray 10 by enough clearance that the tray 10 can be easily manually inserted into and removed from the housing 12 through opening 42.

Along each bottom side of the opening 42 and extending along the junction of the sides 48, 50 and the bottom 42 are located slides 54. The slides 54 have an L-shaped cross-section with one generally horizontal leg of the L extending along the bottom 42 and the other generally vertical leg of the L along one of the sides 48, 50. The slides 54 extend from the front 44 to the back 46 of the housing 12. The legs of the slides 54 are preferably the same as or slightly longer than the width of the longest side of the rectangular cross-section of side frames 24. Thus, the side frames 24 may form runners that slide along the length of the slides 54 as the tray 10 is inserted into and removed from the housing 12. Advantageously, the bottom member of the side frame 24 is an exterior frame member with the bottom 22 of the tray fastened to a top of that bottom member, with the exterior frame member 24 abutting and sliding along slide 54 as the tray 10 moves in and out of the housing 12.

In use, the tray 10 is pulled partially out of or entirely out of the housing 12. Coffee pods may be placed inside the tray 10 with the dividers 35 positioning the coffee pods. The tray is pushed back into the housing 12 after a coffee pod is selected. The top wall 52 of the housing is strong enough that a coffee maker may rest on the top 52.

Figure 2:
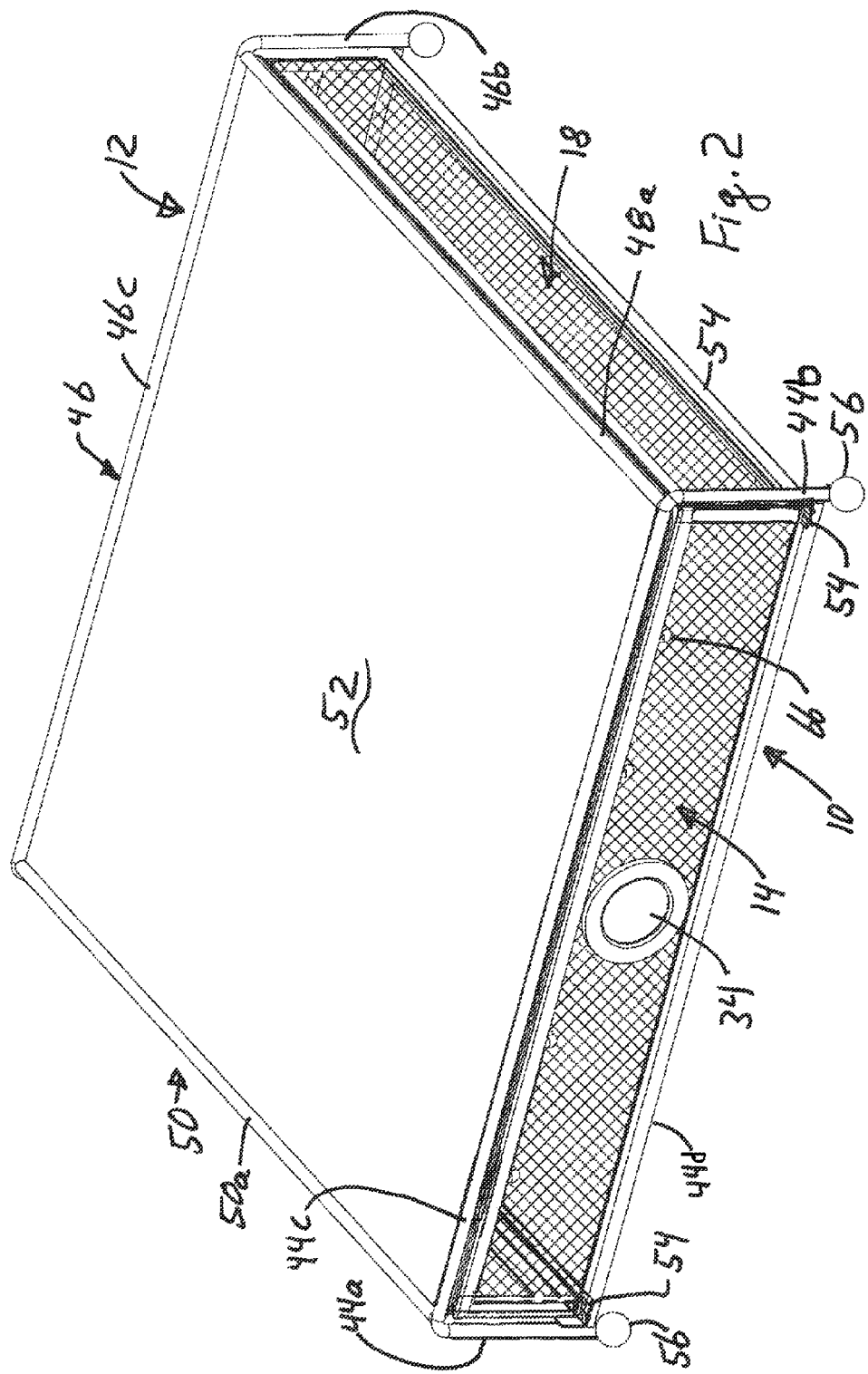
FIG. 2 is a front perspective view of a single tray, coffee pod holder of FIG. 1 with the tray inside the housing.

Referring to FIG. 2, the front frame 44 has generally vertical side posts 44a, 44b joined by generally horizontal top and bottom members 44c, 44d. Likewise, rear frame 46 has generally vertical side posts 46a, 46b joined by generally horizontal top and bottom members 46c, 46d. The frames 44, 46 are preferably formed of rods having circular cross section with the sides posts 44a, 44b, 46a, 46b and top members 44c, 46c being one continuous, integrally formed member bent into shape and ending at feet 46. Bottom or lower members 44d, 46d are spot welded to the posts 44a, 44b, 46a, 46b between which the lower members extend. Other constructions of the frames 44, 46 may be used. Advantageously, a further stop member 47 extends between opposing corner rear 46a, 46b with the stop member 47 positioned so the back of the tray will abut the stop member 47 to prevent the tray 10 from sliding out the back of the housing 12.

Figure 3:
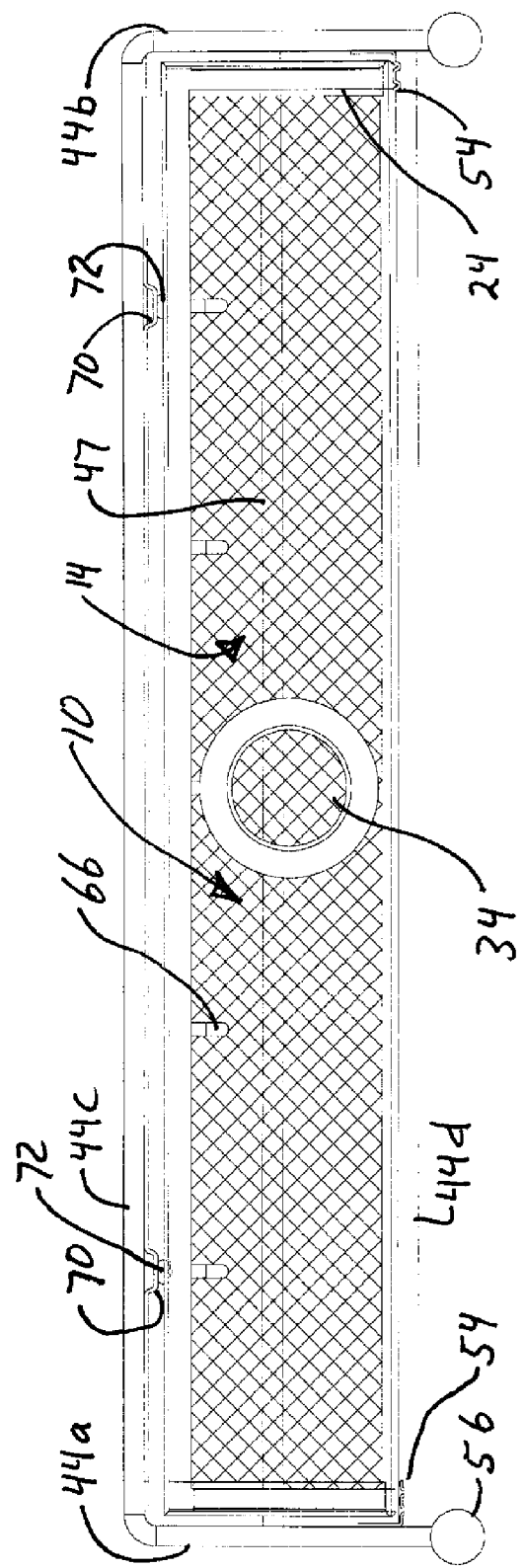
FIG. 3 is a front plan view of the coffee pod holder of FIG. 2.
Figure 4:
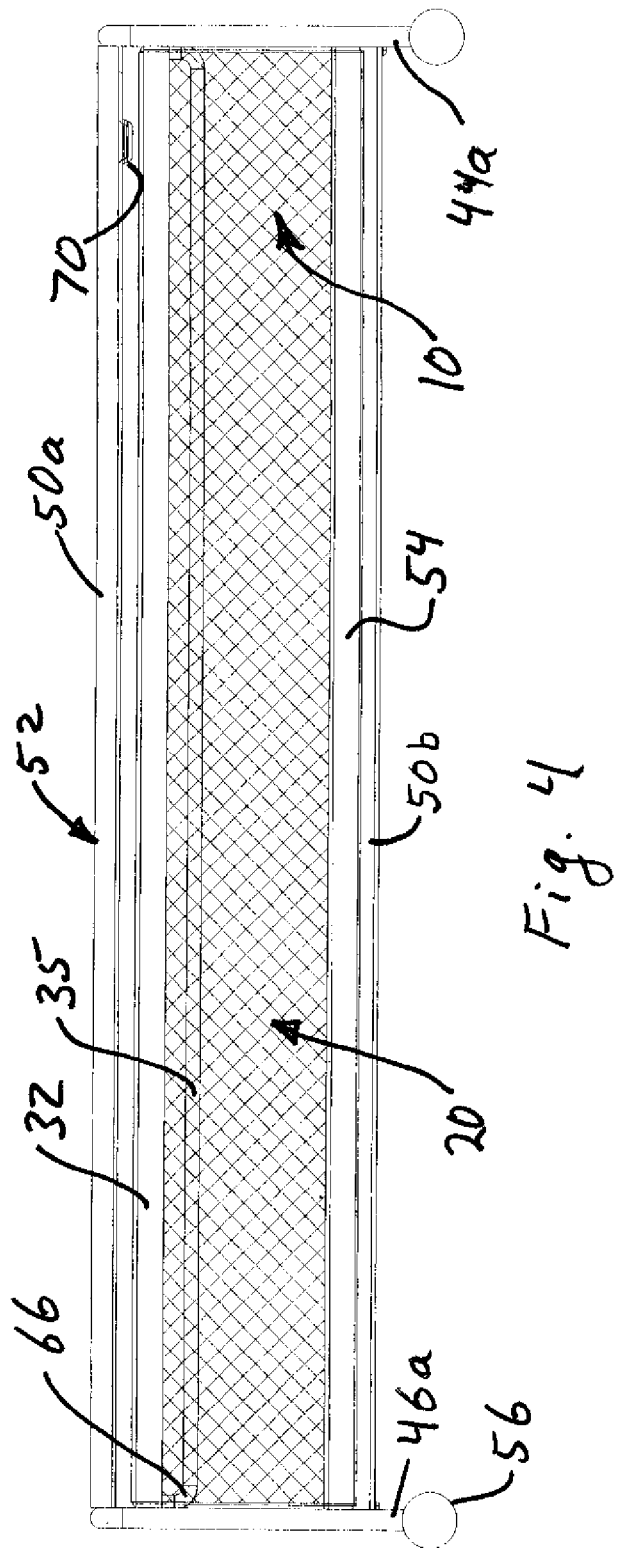
FIG. 4 is a right side plan view of the coffee pod holder of FIG. 2 with the opposite side being a mirror image thereof.
Figure 5:
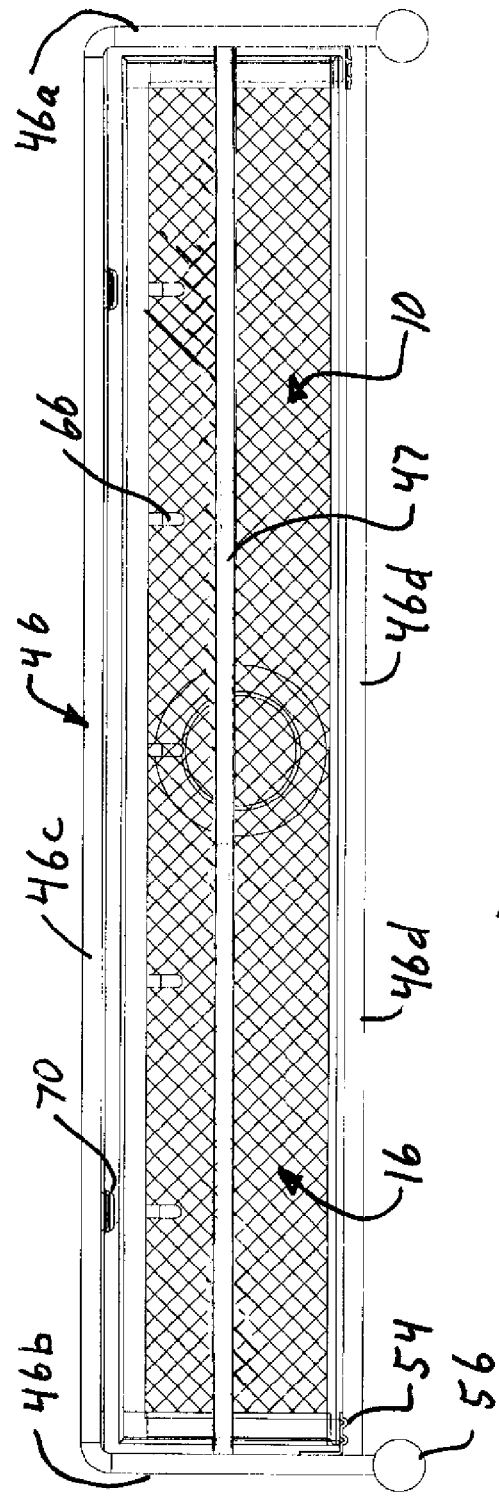
FIG. 5 is a back plan view of the coffee pod holder of FIG. 2.

Referring to FIGS. 2, 3 and 5, the ends of the distal slides 54 that fasten to the front and rear frames 44, 46, respectively, are corrugated or indented to form a wavy portion at the distal ends of the slides 54. The indentations or waves begin at or very near the distal end of the slides 54 and extend along the length of the slide for a short distance of about ⅛ to one inch, but may extend further from the distal ends. The indentations form longitudinal indentations, with from one to three indentations being preferred. The bottom of the indentations or waves are preferably thermally bonded (e.g., spot welded) to the bottom members 44d, 46d of the wire frames 44, 46 to which the slides 54 fasten, but other fastening mechanisms can be used, such as adhesives or mechanical connections.

The longitudinal indentations or wavy portions help strengthen the connection with the lower frame members 44d, 46d to which the slides 54 fasten and help strengthen the bottom portion of the slides 54 at the distal ends of the slides where they connect to the lower frame members 44d, 46d of the front and rear sides of the tray. The slides 54 advantageously extend between and fasten to the top of the lower frame members 44d, 46d.

In further variations, the housing 12 and tray 10 may be repeated and either stacked on top of each other to form separate, stacked structures. Or alternatively, the housing sides 48, 50 may be extended to form a single piece side that accommodates a plurality of openings 40 with at least the slides 54 joining the front and back 46, 48 of the housing for each tray. Alternatively, the sides 54 may be joined to the sides 48, 50 of the housing, or joined to any combination of the sides, front or back of the housing.

Advantageously a foot 56 is located at each bottom corner of the housing 12. Each foot 56 may be separately fastened to the bottom corner by various means such as adhesives, threaded fasteners, thermal bonding such as spot welding, etc. Advantageously the foot 56 is formed on a slightly extending end of a portion of the rods forming the corner posts 44a, 44b, 46a, 46b of the front 44 or back 46 of the housing, but could be formed by extending the rods forming the sides 48, 50 of the housing. FIGS. 1-3 show the foot 56 being formed by a downwardly extending rod forming the front and back 44, 46 of the housing, with each foot 56 having a recess to receive the downwardly extending rod.

Referring to FIGS. 1-7, the coffee pods are advantageously held within the tray 10 by dividers 35 fastened to front and back support rails 62, 64 to form a holder 60. The dividers 35 are spaced apart a distance sufficient to allow a plurality of coffee pods to be inserted between the dividers 35 and rest on the bottom 22 of the tray 10. The support rails 62, 64 in use extend along and are fastened to the top frame 28 at the front and back sides of that top frame. The support rails 62, 64 are fastened to the ends 66 of the dividers 35. Preferably, but optionally, the opposing ends 66 of dividers 35 are curved to form a right angle bend the end of which is fasted to the support rails 62, 64, so the dividers are located slightly offset from the top frame 28. Advantageously the dividers 35 are below the top frame 28. The dividers 35 and their curved ends 66 form a shallow U-shape when viewed from the side, with very short, curved legs providing the offset from the top frame 28. The figures show five dividers 35 extending between the support rails 62, 64 to form a holder 60. But the number of dividers could vary. It is believed more efficient to form the holder 60 outside the tray 10 and then fasten the holder to the tray 10 by various means, including spot welding, adhesives, hooks, snap locking projections, threaded fasteners, mechanical fasteners etc.

The holder 60 thus forms a generally U-shaped frame which may be lifted by the upper rails 62, 64. When the holder 60 is placed inside the tray 10, the bottom members 70a, 70b rest against the bottom 22 of the tray to support the rails a predetermined location above the bottom 22. The figures show five dividers 35, but the number of dividers in the holder 60 may vary depending on the size of the tray 10.

Referring to FIGS. 1, 3-5 and 7, one or more recesses 70 are formed in the top wall 52 of the housing 12. The recesses 70 are depressed areas offset from the generally planar top wall 52 in a direction toward the location of the tray 10 within the housing during use. A circular or rectangular recess 70 is believed suitable, and may be formed by punching or deforming the top wall 52 in the downward direction as viewed in FIGS. 1 and 3-5. Advantageously, a projecting stop 72 is fastened through a hole in the bottom of the recess 70. The projecting stop 72 is preferably a rivet. The projecting stop 72 extends downward a distance sufficient to engage the top rear portion of the back 16 of tray 10 as the stray slides from the housing 12. The stop 72 extends downward a distance sufficient to abut the back 16 of tray 10 and thus limit the distance which a tray 10 may be withdrawn from the housing 12. The stop 72 is conceptually a protrusion on the housing 12 (including the frame forming the housing) that hits the tray 10 to limit relative motion between the tray and housing. The depicted stop 72 comprises a downward extending rivet fastened to the bottom of recess 70. The recess 70 and/or stop 72 are located so that the tray 10 can be tilted so the back 16 of the tray can pass below the stop 16 in order to insert the tray into the housing 12 and then orientate the tray 10 horizontally to complete the insertion into the housing. When the tray is removed horizontally the stop 72 hits the back side 16 of the tray to limit relative motion of the tray 10 and housing 12. Advantageously, a covering such as a non-slip polymer or rubber may be placed over the top 52 to hide the recess 70 and rivet stop 72 from view. Advantageously, there are two recesses 70 and stops 72, one adjacent each opposing side of the top wall 52 and adjacent the sides 18, 20 of the tray 10.

Figure 14:
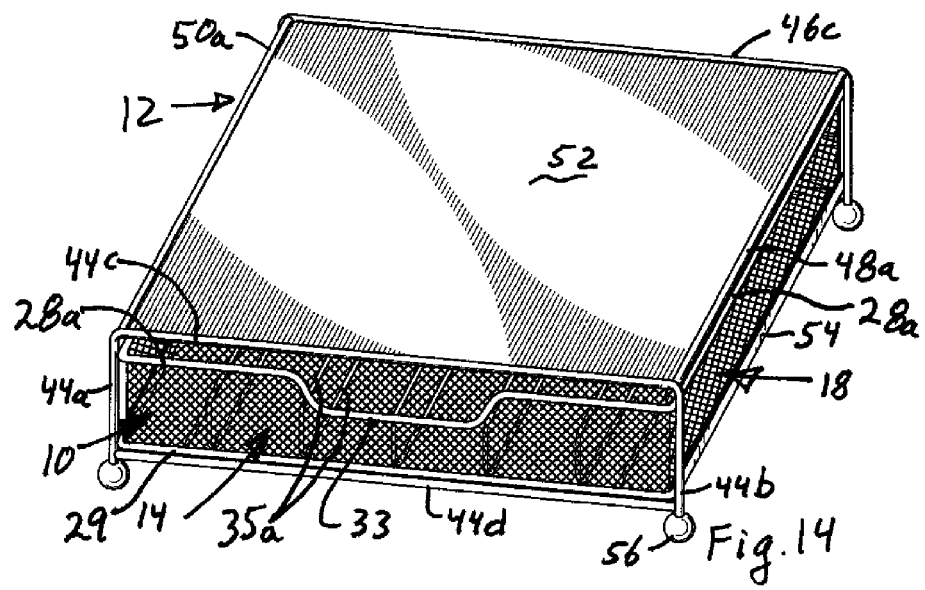
FIG. 14 is a perspective view of the coffee pod holder of FIG. 13 with the tray in the housing.
Figure 13:
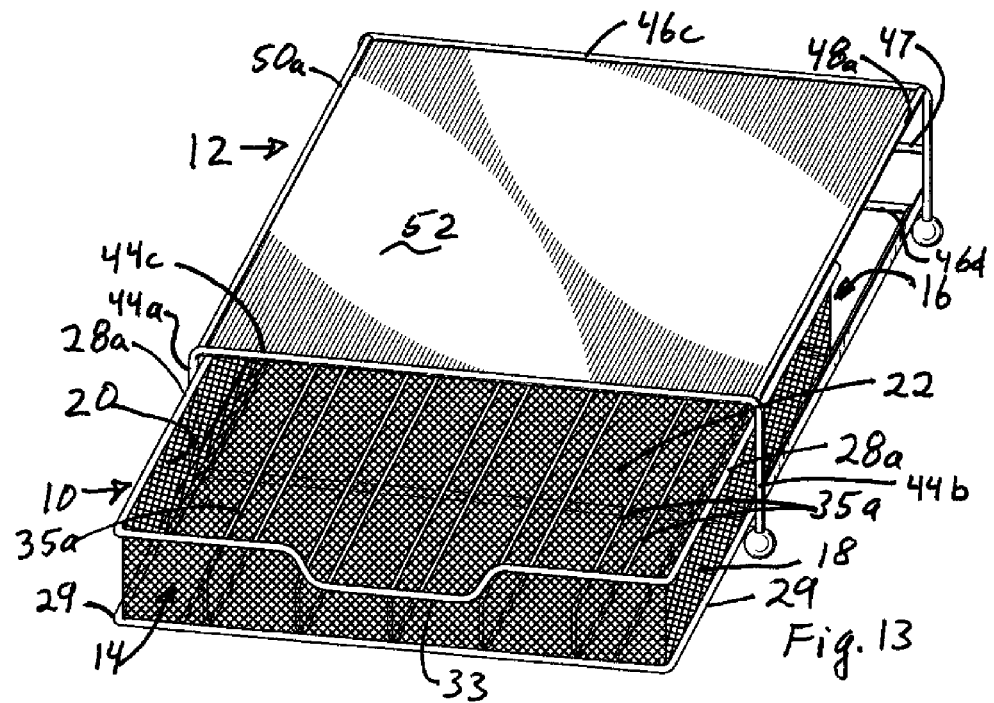
FIG. 13 is a perspective view of a coffee pod holder as in FIG. 1 having a tray with five dividers.

Referring to FIGS. 13-14, a further coffee pod holder is provided. The housing 12 is as previously described, with housing front corner posts 44a, 44b, and front top member 44c. The description of common parts is not repeated.

The rectangular tray 10 in this embodiment has no discrete frame portion forming corner posts and instead uses the wire mesh material 26 that forms the front 14, back 16, and sides 18, 20 of the tray to separate and join a top frame 28a to a bottom frame 29. The top frame 28a extends around the entire periphery of the open top of the tray 10. The top frame 28a is formed by an elongated member, such as a wire, and advantageously has a circular cross-section, although other cross-sectional shapes can be used. The top frame 28a can be spot welded, friction bonded, adhered or otherwise permanently connected to the mesh material 26 at the top of the material. Advantageously, the top frame 28a fastens to the outside or exterior of the material 26 along the top edge as seen in FIGS. 13, 14. Less preferably the top frame 28a fastens to the top edge of the material 28a. Similarly, the bottom frame 29 preferably fastens to the outside or exterior of the material 26 along the corners where the bottom 22 of the tray bends upward to form the sides 18, 20, front 14 and back 16 of the tray 10. The tray 10 has a rectangular shape so the top frame 28a and bottom frame 29 have rectangular shapes conforming to the shape of the tray 10 as viewed from the top or bottom.

The tray 10 may have the handle or opening 34 as in the prior embodiment, or it may have the top frame 28a formed with a lowered portion 33 that is closer to the bottom frame 29 in order to form a space sufficient for a user's fingers to fit between the upper frame 28a and the top member 44c of the housing 12.

The dividers 35a are shown as comprising rectangular-shaped loops of wire having a short ends connected to one of the front 14 and back 16 and a wire resting on the bottom 22 or connected thereto. The dividers 35a are spaced apart a distance of about D or slightly larger to form rows sized to receive a plurality of coffee pods during use of the tray. The dividers 35a are shorter than the height of the coffee pods, although preferably close to the height of the lip or flange 3 on the outer periphery of the lid of the coffee pod FIGS. 8-10.

As required, detailed embodiments of the present invention are disclosed herein; however, it is to be understood that the disclosed embodiments are merely exemplary of the invention, which may be embodied in various forms. Thus, various versions of the trays 10 may be used within one housing 12, and the various dividers 35, 35a may be used with different trays 10, and in different numbers to form different numbers of rows of coffee pods than expressly illustrated in the drawings. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A housing and tray assembly for holding coffee pods having a body with maximum body diameter D, comprising:
   a rectangular, wire frame housing wider than it is high and having two opposing sides, a top and bottom, a back and a front, with a housing corner post at each corner of the housing, the top comprising a sheet of material, the housing defining an opening in the front with two slides each located at a different lower corner of the opening, the slides extending along opposing sides of the housing to a back of the housing to provide a generally flat surface extending the length of the housing;
   a rectangular, wire frame tray sized to fit into the opening in the front of the housing, the tray having an upper rectangular frame held in relative position by tray corner posts with two tray corner posts on each side having their bottoms connected by an exterior bottom frame member to form a rectangular side frame encircling each side, the tray posts and bottom frame member of each side frame formed of a strip of material having a rectangular cross section wider than it is thick and being located and orientated so the width of each side frame moves along a different one of the slides during use, the tray having an open tray top and an opposingly located tray bottom surface fastened to a top of each bottom frame member, the tray having a tray back and an opposing tray front each extending between different ones of the tray corner posts;
   a plurality of dividers fastened to the front and back of the tray and spaced apart a distance of about D or slightly larger to define rows for receiving coffee pods during use.

2. The housing and tray assembly of claim 1, wherein the slides have a cross sectional shape with a horizontal and vertical leg each oriented at a right angle to each other, with the horizontal leg having at least one longitudinal indentation at the distal end of the runner at the front of the housing.

3. The housing and tray assembly of claim 1, wherein the top of the housing has a stop extending downward toward the tray a distance sufficient to abut the back of the tray and limit relative movement of the tray and housing as the tray is pulled out of the opening n the housing.

4. The housing and tray assembly of claim 2, wherein the top of the housing has a motion limit stop extending downward toward the tray a distance sufficient to abut the back of the tray and limit relative movement of the tray and housing as the tray is pulled out of the opening n the housing.

5. The housing and tray assembly of claim 4, wherein the motion limit stop comprises a rivet fastened to the top surface of the housing.

6. The housing and tray assembly of claim 1, wherein the tray bottom surface is formed of a metal mesh material which is bent upward to form the front and back of the tray.

7. The housing and tray assembly of claim 5, wherein the tray bottom surface is formed of a metal mesh material which is bent upward to form the front and back of the tray.

8. The housing and tray assembly of claim 1, wherein the tray bottom surface is formed of a metal mesh material which is bent upward to form the two opposing sides of the tray.

9. The housing and tray assembly of claim 7, wherein the front of the tray is framed by two front tray corner posts and a front support rail connected to the upper portions of the tray corner posts and without a rail member connecting the bottom of the front corner posts.

10. The housing and tray assembly of claim 9, wherein the front tray corner post has a rectangular cross section with a width larger than a thickness and oriented so that its thickness aligns with and fastens to the thickness of the corner posts.

\* \* \* \* \*